(12) United States Patent
Howard (10) Patent No.: US 6,336,109 B2
(45) Date of Patent: *Jan. 1, 2002

(54) METHOD AND APPARATUS FOR INDUCING RULES FROM DATA CLASSIFIERS

(75) Inventor: Gary Howard, Sawbridgeworth (GB)

(73) Assignee: Cerebrus Solutions Limited, Harlow (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/840,115

(22) Filed: Apr. 15, 1997

(51) Int. Cl.[7] ................................................. G06N 3/04
(52) U.S. Cl. ............................. 706/25; 706/2; 706/12; 706/13; 706/25
(58) Field of Search ................................ 706/2, 12, 13, 706/25, 84, 41; 370/330; 382/229

(56) References Cited

U.S. PATENT DOCUMENTS

| | | | | |
|---|---|---|---|---|
| 5,164,992 A | * | 11/1992 | Turk et al. | 382/118 |
| 5,438,644 A | * | 8/1995 | Fu | 706/12 |
| 5,479,574 A | * | 12/1995 | Glier et al. | 706/25 |
| 5,479,576 A | * | 12/1995 | Watanabe et al. | 705/25 |
| 5,515,477 A | * | 5/1996 | Sutherland | 706/41 |
| 5,724,263 A | * | 3/1998 | Raguram et al. | 706/84 |
| 5,740,323 A | * | 4/1998 | Nomura et al. | 706/13 |

FOREIGN PATENT DOCUMENTS

| | | |
|---|---|---|
| EP | 0436913 A2 | 12/1990 |
| EP | 0521643 A1 | 6/1992 |

OTHER PUBLICATIONS

Hassoun, Mohamad H., Fundamentals of Artificial Neural Networks, The MIT Press, 1995, pp. 112–126, Mar. 1995.*

Chen, C.H., Fuzzy Logic and Neural Network Handbook, McGraw Hill, Inc., pp. 7.1–7.33, Jan. 1996.*

Weiss et al "Optimized Rule Induction" IEEE Expert, vol. 8, No. 6, Dec. 1, 1996, pp. 61–69, XP000414496.

Koihu Chen et al "A Machine Learning Approach to the Automatic Synthesis of Mechanistic Knowledge for Engineering Decision–Making", Mar. 14, 1988, XP000120206.

Limin Fu "Rule Generation from Neutral Networks", IEEE transacations on systems, man and Cybernetics. Vol. 24, No. 8 Aug. 1, 1994 XP000458814.

Rye Senjen et al "Hybrid Expert Systems for Monitoring and Fault Diagnois" Mar. 1, 1993 XP000379611.

Scarfe R T et al "Data Mining Applications in BT" IEE Coloquium on "Knowledge Discovery in Databases" XP002067574.

P Cheesman, J. Stutz, "Bayesian Classification (AutoClass) Theory and Results", in "Advances in Knowledge Discovery and Data mining", UM Fayyed et al Eds. The AAAI Press, Menlo Park, 1995.

(List continued on next page.)

*Primary Examiner*—Mark R. Powell
*Assistant Examiner*—Wilbert L. Starks
(74) *Attorney, Agent, or Firm*—Foley, Hoag & Eliot LLP; Kevin A. Oliver

(57) ABSTRACT

A method of processing data relating to a plurality of examples using a data classifier arranged to classify input data into one of a number of classes, and a rule inducer, comprising the steps of:

(i) inputting a series of inputs to the data classifier so as to obtain a series of corresponding outputs;

(ii) inputting said series of outputs and at least some of said series of inputs to the rule inducer so as to obtain a series of rules which describe relationships between the series of inputs to the data classifier and the series of corresponding outputs from the data classifier.

18 Claims, 5 Drawing Sheets

OTHER PUBLICATIONS

R Hanson, J Stutz, P Cheesman, "Bayesian Classification Theory", Technical Report FIA–90–12–7–01, NASA Ames Research Centre, Artifical Intelligence Branch, May 1991.

P Clark and T Niblett, "The CN2 Induction Algorithm", in Machine Learning Journal, 3(4), pp 261–283, Netherlands: Cluner (1989).

See attached.

P Clark and R Boswell, "Rule Induction with CN2: Some Recent Improvements", in Machine Learning—Proceedings of the Fifth European Conference (EWSL–91), pp. 151–163, Ed: Y Kodratoff, Berlin: Springer Verlag (1991).

R Boswell Manual for CN2 version 6.1 (1990) The Turing Institute Limited IT/P2154/RAB/4/1–5.

Robert Andrews, Joachin Diederich and Alan B Tickle (Jan. 1995) "A survey and critique of techniques for extracting rules from trained artificical neural network" Neurocomputing Research Centre, Queensland University of Technology, Box 2434 GPO Brisbane 4001, Queensland Australia.

See list below.

* cited by examiner

| | | |
|---|---|---|
| 51 — sumOfcountOftimestamp | int | 12 |
| 52 — sumOfsumOfnumpack | int | 12 |
| 53 — sumOfsumOfpcomplete | int | 12 |
| 54 — sumOfsumOflcomplete | int | 12 |
| 55 — sumOfsumOffcomplete | int | 12 |
| 56 — sumOfsumOfbytes | int | 12 |
| 57 — tclass | char | 3 |

Fig. 5

| | | | | | | 61 | 62 |
|---|---|---|---|---|---|---|---|
| 27 | 27 | 14 | 0 | 192 | 2753996 | c0 |
| 4030 | 99 | 2524 | 274 | 661982 | 2147483647 | c3 |
| 1 | 8 | 8 | 0 | 314 | 11569353 | c0 |
| 9 | 9 | 0 | 0 | 47 | 20955 | c0 |
| 5 | 5 | 5 | 0 | 0 | 326127173 | c0 |
| 8 | 8 | 6 | 0 | 14 | 11127281 | c0 |
| 1 | 1 | 1 | 0 | 1 | 18532215 | c0 |
| 12 | 44 | 40 | 0 | 2262 | 29605994 | c1 |
| 58 | 395 | 444 | 0 | 88 | 7034626 | c1 |
| 2 | 36 | 36 | 0 | 32 | 101695 | c0 |
| 27 | 0 | 0 | 0 | 26 | 1878290 | c0 |
| 81 | 81 | 14 | 0 | 199 | 172661219 | c0 |
| 1 | 4 | 4 | 0 | 14 | 40322070 | c0 |
| 634 | 634 | 564 | 0 | 627 | 3487708 | c1 |
| 41 | 41 | 41 | 0 | 33 | 4849 | c0 |
| 27 | 27 | 24 | 0 | 305 | 24723757 | c0 |
| 18 | 18 | 0 | 0 | 0 | 0 | c0 |
| 77 | 324 | 289 | 0 | 36 | 666977443 | c1 |
| 49 | 224 | 176 | 0 | 51405 | 178757750 | c1 |
| 11 | 11 | 0 | 0 | 77 | 32102540 | c0 |
| 48 | 68 | 48 | 0 | 23 | 1272385 | c0 |
| 1 | 7 | 6 | 0 | 208 | 106344131 | c0 |
| 28 | 0 | 0 | 0 | 17183 | 1090763248 | c2 |
| 12 | 12 | 3 | 0 | 10 | 180839504 | c0 |
| 6 | 6 | 4 | 0 | 6 | 162413 | c0 |
| 273 | 289 | 266 | 0 | 4654 | 1590489201 | c1 |
| 10 | 12 | 4 | 0 | 0 | 510138960 | c0 |
| 2040 | 511 | 0 | 0 | 440 | 2430247 | c1 |
| 7685 | 42047 | 42410 | 4879 | 71747 | 2147483647 | c3 |
| 40 | 25 | 18 | 0 | 40025 | 1487415336 | c2 |
| 5 | 5 | 2 | 0 | 222 | 90907934 | c0 |
| 26 | 27 | 26 | 0 | 44 | 133511485 | c0 |
| 3 | 3 | 3 | 0 | 25 | 429149 | c0 |
| 12 | 0 | 0 | 0 | 31828 | 2147483647 | c2 |
| 16 | 16 | 13 | 0 | 1013 | 17898735 | c0 |
| 13 | 4 | 2 | 0 | 12600 | 73471296 | c2 |
| 1 | 1 | 1 | 0 | 26 | 99310 | c0 |
| 5 | 0 | 0 | 0 | 1417 | 167006078 | c0 |
| 14 | 13 | 10 | 0 | 1 | 12288015 | c0 |
| 1 | 1 | 1 | 0 | 0 | 0 | c0 |
| 35 | 20 | 14 | 0 | 10189 | 382049867 | c2 |
| 43 | 0 | 0 | 0 | 17 | 424776 | c0 |
| 3 | 3 | 0 | 0 | 0 | 0 | c0 |
| 207 | 0 | 0 | 0 | 12 | 39075223 | c0 |
| 6 | 6 | 5 | 0 | 8043 | 577326084 | c2 |
| 35 | 35 | 26 | 0 | 10 | 55240265 | c0 |
| 1722 | 9789 | 10020 | 0 | 215469 | 1822459461 | c3 |
| 363 | 512 | 534 | 0 | 2301 | 1815469333 | c1 |
| 2182 | 3411 | 1348 | 0 | 1646 | 212119428 | c1 |
| 1 | 1 | 1 | 0 | 0 | 0 | c0 |
| 198 | 198 | 184 | 0 | 180 | 1240857 | c1 |

*Fig. 6*

```
RULE FILE
@
Time: [ Fri Sep 27 15:13:28  1996 ]

Examples: dclass.exs
Algorithm: UNORDERED
Error_Estimate: LAPLACIAN
Threshold: 0.00
Star: 5
@

*UNORDERED-RULE-LIST*
IF  sumOfsumOfnumpack < 42.50
   AND sumOfsumOffcomplete < 4730.00
THEN tclass = c0 [30 0 0 0]
IF   sumOfsumOfpcomplete < 112.00
   AND sumOfsumOffcomplete < 319.50
THEN tclass = c0 [30 0 0 0]
IF   148.50 < sumOfsumOfnumpack < 6600.00
THEN  tclass = c1 [0 9 0 0]

IF   sumOfcountOftimestamp  < 30.00
   AND sumOfsumOfnumpack > 42.50
THEN  tclass = c1 [0 1 0 0]
IF sumOfcountOftimestamp <44.50
   AND sumOfsumOffcomplete > 6348.50
THEN  tclass = c2 [0 0 6 0]
If   sumOfsumOfpcomplete > 1936.00
THEN  tclass = c3 [0 0 0 3]
(DEFAULT) tclass = c0 [32 10 6 3]
```

*Fig. 7*

```perl
!/opt/corp/contrib/bin/perl -w sub apply
{
$n=($sumOfcountOftimestamp,$sumOfsumOfnumpack,$sumOfsumOfpcomplete,
       $sumOfsumOflcomplete,$sumOfsumOffcomplete,$sumOfsumOfbytes) = split(' ',$_);
   if ($n != 6 && $warn)
      { print STDERR "Wrong number of input fields: $n != 6 in line $.\n"; }
rules: {
if (($sumOfsumOfnumpack < 42.50) && ($sumOfsumOffcomplete < 4730.00))
  { $tclass = (defined $c{'c0'}) ? $c{'c0'} : 'c0'; last rules; } # 30 0 0 0 if (($sumOfsumOfpcomplete < 112.00) && ($sumOfsumOffcomplete < 319.50))
  { $tclass = (defined $c{'c0'}) ? $c{'c0'} : 'c0'; last rules; } # 30 0 0 0 if ((148.50 < $sumOfsumOfnumpack) && ($sumOfsumOfnumpack < 6600.00))
  { $tclass = (defined $c{'c1'}) ? $c{'c1'} : 'c1'; last rules; } # 0 9 0 0 if (($sumOfcountOftimestamp < 30.00) && ($sumOfsumOfnumpack > 42.50))
  { $tclass = (defined $c{'c1'}) ? $c{'c1'} : 'c1'; last rules; } # 0 1 0 0 if (($sumOfcountOftimestamp < 44.50) && ($sumOfsumOffcomplete > 6348.50))
  { $tclass = (defined $c{'c2'}) ? $c{'c2'} : 'c2'; last rules; } # 0 0 6 0 if (($sumOfsumOfpcomplete > 1936.00))
  { $tclass = (defined $c{'c3'}) ? $c{'c3'} : 'c3'; last rules; } # 0 0 0 3

{ $tclass = (defined $c{'c0'}) ? $c{'c0'} : 'c0'; last rules; } # 32 10 6 3

}
          return $tclass;
} if ($#ARGV < $[) { die "Need some arguments.\n"; }

$warn = 0;
while ($ARGV[0] =~ /^-/)
{
          if ($ARGV[0] eq "-w") { $warn =1; }
          if ($ARGV[0] eq "-d")
          {
                     open(Desc,$ARGV[0]) ||
                                die "Can't find class descriptions: ".$ARGV[0]."\n";
                     while (<Desc>)
                     {
                       chop;
                       ($classname,$decription) = split(',',$_);
                       $c{$classname}=$decription;
                     }
                     close Desc;
          }
          shift;
}
while (<>)
{
  chop;
  $class = &apply();
  print $_," ",$class,"\n";
}
```

METHOD AND APPARATUS FOR INDUCING RULES FROM DATA CLASSIFIERS

BACKGROUND OF THE INVENTION

1. Field of the Invention

This invention relates to a method and apparatus for interpreting information and particularly for information relating to a communications network.

2. Description of the Prior Art

In the telecommunications field, large amounts of data are available, for example about customer behaviour and telephone usage. This data contains potentially useful information for many purposes such as detection of fraud, marketing, billing, maintenance planning and fault detection. However, the data must first be analysed in order to extract features that can easily be used for a given task. This task of extracting useful features from the data is often difficult because the user does not know which type of features to look for. For example, the information may be in the form of call detail records (CDRs). A CDR is a log of an individual telephone call which contains information such as the length of the telephone call, the customer account number, the type of call and many other pieces of information. Over a given time period many CDRs will be recorded, each containing many different pieces of information. When faced with this mass of information it can be difficult to know what features to extract for a particular problem.

One possibility is to use a data classifier which searches for a set of classes and class descriptions that are most likely to explain a given data set. Several types of such data classifiers are known. For example, Bayesian classifiers, neural network classifiers and rule based classifiers. For a given task, a classifier is typically trained on a series of examples for the particular task. After the classifier has been trained then new examples are presented to it for classification. The classifier can be trained either using a supervised method or an unsupervised method. In a supervised method the training examples that are used are known examples. That is the user knows which classes these training examples should be classified into and this information is also provided to the classifier during the training phase. For unsupervised training, there is no information about the desired classes for the training examples.

One problem is that the output of classifiers is often difficult to interpret. This is especially the case when unsupervised training has been used. The classifier output specifies which of a certain number of classes each input has been placed into. The user is given no explanation of what the classes mean in terms of the particular task or problem domain. Neither is the user provided with any information about why a particular input has been classified in the way that it has.

Previously, users have needed to carry out complex analyses of the classifier in order to obtain these kinds of explanations. Known examples can be input to the classifier and the outputs compared with the expected outputs. However, in order to do this known examples must be available and this is often not the case. Even when known examples can be obtained this is often a lengthy and expensive procedure.

A further problem is that because these kinds of explanations are not available the user's confidence in the system is reduced. This means that the user is less likely to run the system, thus reducing the value of such a system. Also, errors and mistakes are hard to detect. For example, if erroneous data is entered by mistake a resulting error in the output could easily go unchecked. Similarly, if the training examples were not representative of the example population for the particular task then errors would be produced that would be hard to find.

It is accordingly an object of the present invention to provide an apparatus and method for interpreting information relating to a communications network which overcomes or at least mitigates one or more of the problems noted above.

SUMMARY OF THE INVENTION

According to a first aspect of the present invention there is provided a method of processing data relating to a plurality of examples using a data classifier arranged to classify input data into one of a number of classes, and a rule inducer, comprising the steps of:

(i) inputting a series of inputs to the data classifier so as to obtain a series of corresponding outputs;

(ii) inputting said series of outputs and at least some of said series of inputs to the rule inducer so as to obtain a series of rules which describe relationships between the series of inputs to the data classifier and the series of corresponding outputs from the data classifier. This provides the advantage that the rules can be used to provide an explanation for the user about how the classification is performed. Also, the rules can be used together with other information about the problem domain or task to help the user determine a "meaning" for each of the classes. Advantageously, the user's confidence in the system is increased and errors in the system can more easily be detected and corrected.

Preferably, the data classifier is unsupervised. The output of an unsupervised classification system is especially difficult to interpret. Advantageously, the rules produced according to the invention can be used to help the user determine a "meaning" for the output of the unsupervised classifier.

Preferably, the method further comprises the step of transforming the series of rules into a format such that the formatted rules can be used as a data classifier. This provides the advantage that a rule based classifier can easily be created without the need for the user to determine the rules directly from the data set or other data source.

Preferably the method further comprises the step of incorporating the rules into a case-based reasoning system. This provides the advantage that a case-base reasoning system can easily be created without the need for the user to determine the rules directly from the data set or other data source. Advantageously the case-based reasoning system is able to learn from new examples.

According to a second aspect of the present invention there is provided a method of processing data relating to a communications network using a rule extractor and a neural network data classifier comprising the steps of:

(i) inputting a series of training data inputs to the neural network and training the neural network using this series of training data so as to obtain a series of output values corresponding to the training data inputs;

(ii) inputting information about the configuration of the trained neural network to the rule extractor so as to obtain a series of rules which describe relationships between the series of training data inputs and the series of output values. This provides the advantage that the rules can be used to provide an explanation for the user about how the classification is performed. Also, the rules can be used together with other information about the problem domain or task to help the user determine a "meaning" for each of the classes. Advantageously, the user's confidence in the system is increased and errors in the system can more easily be detected and corrected.

According to another aspect of the present invention there is provided a computer system for processing data relating to a communications network comprising:

a data classifier arranged to classify input data into one of a number of classes;

a rule inducer;

a first input arranged to accept a series of inputs to the data classifier;

a first output arranged to provide a series of corresponding outputs from the data classifier;

a second input arranged to accept said series of outputs and at least some of said series of inputs to the rule generator; and a second output arranged to output from the rule generator a set of rules which describe relationships between the series of inputs to the data classifier and the series of corresponding outputs from the data classifier. This provides the advantage that the rules can be used to provide an explanation for the user about how the classification is performed. Also, the rules can be used together with other information about the problem domain or task to help the user determine a "meaning" for each of the classes. Advantageously, the user's confidence in the system is increased and errors in the system can more easily be detected and corrected.

According to another aspect of the present invention there is provided a computer system for processing data relating to a telecommunications network comprising:

(i) a rule extractor;

(ii) a neural network data classifier;

(iii) a first input arranged to accept a series of training data inputs to the neural network;

(iv) a processor arranged to train the neural network using the series of training data inputs so as to produce a series of output values corresponding to the training data inputs; and (v) a second input arranged to accept information about the configuration of the trained neural network to the rule extractor so as to produce a series of rules which describe relationships between the series of training data inputs and the series of output values. This provides the advantage that the rules can be used to provide an explanation for the user about how the classification is performed. Also, the rules can be used together with other information about the problem domain or task to help the user determine a "meaning" for each of the classes. Advantageously, the user's confidence in the system is increased and errors in the system can more easily be detected and corrected.

BRIEF DESCRIPTION OF THE DRAWINGS

FIG. 8 shows the output of FIG. 7 incorporated into a rule-based classifier.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

Definitions rule extractor—any mechanism or technique for generating a set of rules to describe the relationship between the inputs and outputs of a trained neural network that use information about the weighted connections in the neural network.

rule inducer—any mechanism or technique for generating rules to describe a plurality of data that involves generalising from the data.

data classifier—any mechanism or technique for dividing or breaking up a collection of data into groups.

self organising map (SOM)—a neural network architecture which discovers patterns in data by clustering similar inputs together. The data is grouped by the SOM without any prior knowledge or assistance. Grouping is achieved by mapping the data onto a 2-D plane.

Figure 1:
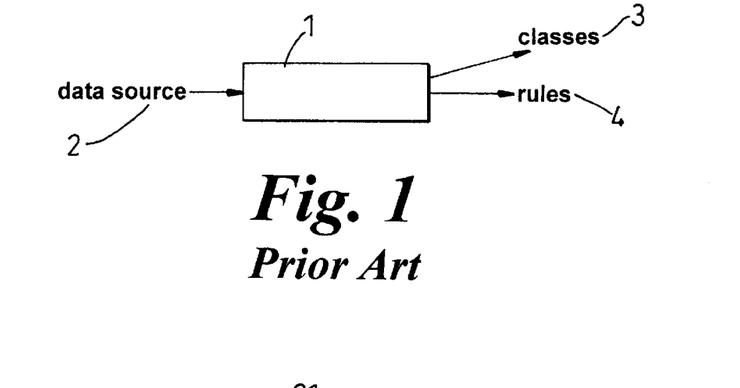
FIG. 1 is a general schematic diagram of an arrangement for interpreting data.

FIG. 1 shows a computer system 1 that is arranged to automatically determine a classification system for a given data set that is provided to the system. The computer system accepts input data from a data source 2. The computer system searches for a set of classes 3 and class descriptions that are most likely to explain the provided data set. Once the classification system has been determined, new data can be input and classified according to this system. For example, in a situation in which information about telephone calls needs to be analysed to detect fraud, the data source 2 consists of information about individual telephone calls made during a certain time period. The computer system 1 determines a classification system and classifies the calls into a number of classes 3. Once this is done, a human operator or user then analyses the classes to see whether fraudulent calls appear only in certain classes. The user obtains an explanation of how that data from the data source 2 has been classified as well as an explanation of what the classes 3 mean in terms of the particular data source 2 and the task or problem (e.g. fraud detection) involved.

In order to provide these explanations, FIG. 1 shows how the computer system 1 is also arranged to produce rules 4 which describe relationships between the input data from the data source 2 and the classes 3. Advantageously, these rules 4 can then be used to provide an explanation of how the computer system 1 classified the input data 2. For example, such an explanation could be, "telephone call number 10 is a member of class 2 because it has feature A and feature B but not feature C". The rules 4 can also be used together with other information to assign a "meaning" to the classes 3 that the input data 2 is classified into. For example, classes could be assigned meanings such as "fraudulent examples" and "non-fraudulent examples".

Figure 2:
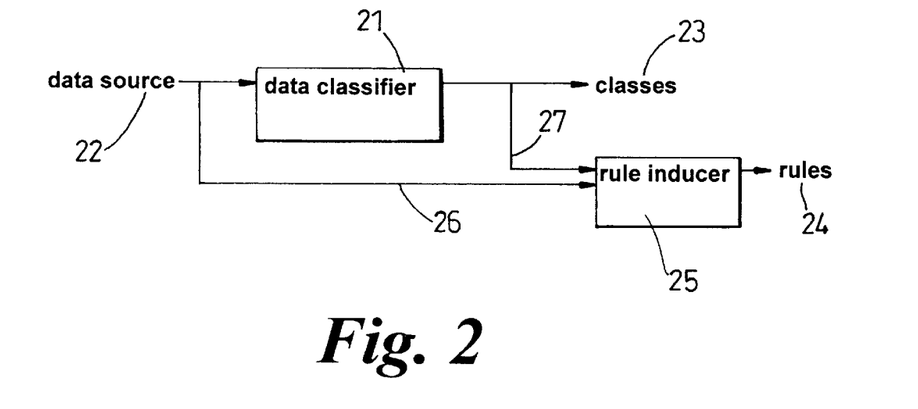
FIG. 2 is a general schematic diagram indicating how a rule inducer and a data classifier are positioned in the arrangement of FIG. 1.

In one example, as shown in FIG. 2, the computer system 1 comprises a data classifier 21 and a rule inducer 25. A series of input data from a data source 22 is input to the data classifier 21 to produce a corresponding set of outputs 23. These outputs comprise information about which of a number of classes 23 each input is a member of. The series of input data from the data source 22 is also input to the rule inducer 25 as indicated by arrow 26. The rule inducer 25 also receives information about the corresponding series of outputs from the data classifier 21 as indicated by arrow 27. Given these inputs 26, 27 the rule inducer 25 produces a series of rules 24 which describe relationships between the series of input data provided to the data classifier 21 and the corresponding series of outputs produced by the data classifier.

Figure 3:
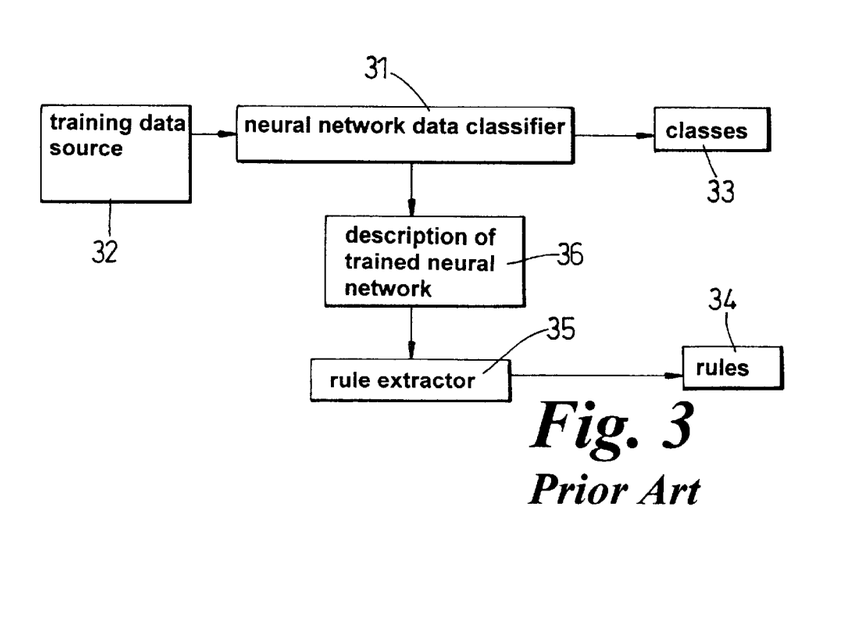
FIG. 3 is a general schematic diagram indicating how a rule extractor and a data classifier are positioned in the arrangement of FIG. 1 according to another embodiment of the invention.

In an alternative example a rule extractor is used instead of a rule inducer. This is illustrated in FIG. 3. In this case the computer system 1 comprises a neural network data classifier 31 and a rule extractor 35. A series of training data 32 is input to the neural network 31 and the neural network is trained using this input data. The neural network 31 produces a series of outputs 33 or classes which correspond to the series of training data. A description of the trained neural network 36 is provided to the rule extractor 35 which is then able to produce a series of rules 34. A description of the inputs 32 to the data classifier 31 may also be required as input to the rule extractor 35. These rules 34 describe relationships between the series of training data 32 and the corresponding series of outputs 33 from the neural network. Any type of rule extractor can be used.

Once the rules 34, 24, 4 have been obtained they can also be used to create a rule-based classifier. This can then be used instead of or as well as the data classifier 21, 31. The rules 34, 24, 4 can also be incorporated into a case-based reasoning system. A case-based reasoning system is advantageous in that it is able to learn by analogy.

A rule inducer is a fundamental component for a case-based reasoning system. Once the computer system 1 has been set up for a particular application, such as for telecommunications data, then the system 1 can be incorporated into a case-based reasoning system. This enables a case-based reasoning system that is suitable for the particular application concerned to be set up quickly and easily.

The computer system 1 can be used to analyse data about the transmission of messages in a communications network. For example, the use of the computer system 1 to interpret data about the performance of EDNA is now described.

EDNA is a system which organises and effects the distribution of messages in a network of computers. It is a UNIX based distribution framework and it can be used to distribute software and files. It can also be used for system management, file collection and process automation.

In this example, the task or aim is to investigate whether users of EDNA fall into distinct groups for billing purposes. If any groups are found it is also desired to explain characteristics of the groups and relate the groups to the problem domain.

Figure 5:
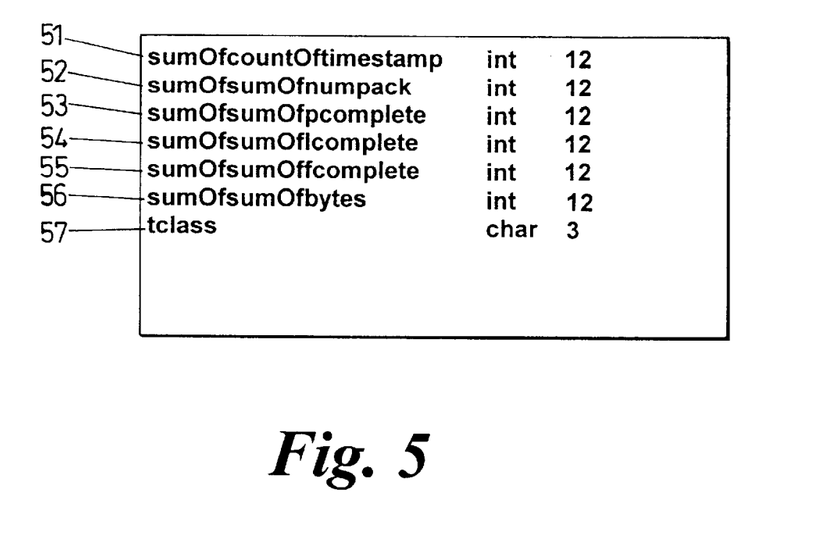
FIG. 5 shows example attributes.

In this example, the data source 2 comprises information about the use of EDNA over a certain time period. For each user of EDNA a list of attribute values is given. A user of EDNA can be defined in different ways. For example, a user could correspond to a department in a work place. It could comprise a number of different human users and/or nodes in the network. The list of attribute values for a user comprises information such as the number of files transferred by the user during the time period. In this example, 6 attributes are used as shown in FIG. 5. These include:

the number of EDNA transfers made during the time period 51;

the number of packages attempted during the time period 52;

the number of packages completed during the time period 53;

the number of links made during the time period 54;

the number of files transferred during the time period 55;

the total number of bytes transferred during the time period 56.

These attributes all relate to past usage of EDNA and comprise figures indicating what EDNA has done over a certain time period.

This data about the use of EDNA is then classified using a data classifier 21 that automatically searches for a set of classes 3 and class descriptions that are most likely to explain the data. Several different classifiers can be used for this. In this example the known classifier AUTOCLASS is used.

AUTOCLASS is an unsupervised classification system based on Bayesian theory. It has been developed by P. Cheesman and his colleagues and is described in the following documents which are intended to be incorporated herein by reference:

P. Cheesman, J. Stutz, "Bayesian Classification (AutoClass) Theory and Results," in "Advances in Knowledge Discovery and Data mining", U. M. Fayyad et al. Eds. The AMI Press, Menlo Park, 1995.

R. Hanson, J. Stutz, P. Cheesman, "Bayesian Classification Theory", Technical Report FIA-90-12-7-01, NASA Ames Research Centre, Artificial Intelligence Branch, May 1991.

P. Cheesman, J. Kelly, M. Self, J. Stutz, W. Taylor, D. Freeman, "AutoClass: a Bayesian Classification system." In proceedings of the Fifth International Conference on Machine Learning, 1988.

P. Cheesman, M. Self, J. Kelly, J. Stutz, W. Taylor, D. Freeman, "Bayesian Classification." In seventh National conference on Artificial Intelligence, pages 607–611, Saint Paul, Minn., 1988.

AutoClass has been implemented in the C programming language and is publicly available on the internet together with the following basic and supporting documentation which is also incorporated herein by reference:

preparation-c.text search-c.text reports-c.text interpretation-c.text checkpoint-c.text prediction-c.text classes-c.text models-c.text These documents are publicly available on the Internet. They are typically distributed together with the source code for AUTOCLASS by file transfer from the Internet.

In the example of the present invention being discussed, the data classifier 21 is AutoClass. Data from the data source 22 is first prepared for use by AutoClass as described in the document preparation-c. text, referred to above. In this example the data source 22 comprises a list of 6 attribute values for each user of EDNA over a certain time period. This data is processed or formatted to meet the requirements specified in preparation-c. text. This involves creating a number of files containing the data and other parameters specified by the user.

The AutoClass is then used to classify the data as described in search-c. text. The output of the data classifier 21, in this case AutoClass, comprises:
(i) a set of classes 3 each of which is described by a set of class parameters, which specify how the class is distributed along the various attributes;
(ii) a set of class weights describing what percentage of EDNA users are likely to be in each class;
(iii) for each EDNA user, the relative probability that it is a member of each class.

AutoClass repeatedly classifies the data to obtain several sets of such results which are then compared by the operator to determine the most successful classification(s).

When AutoClass is used various options can be chosen by the operator. These include parameters such as: specifying how many classes to look for or try; or specifying a maximum duration for the classification. Default values for these parameters are used unless the operator specifies otherwise. In the particular example being discussed, about EDNA, the parameter values were set so as to "look for" 20 classes.

However, it is not essential to use these exact parameter values. In different situations different values may be more appropriate. The various parameters are discussed in search-c. text as well as the other documents referred to above.

The several sets of results are ranked by AUTOCLASS and one set is chosen. Typically the classification which describes the data most completely is used. For example, this can be done by comparing the log total posterior probability value for each classification, as described in interpretation-c.text. The results of the chosen classification can then be analysed using AutoClass by generating simple reports which display the results in different ways. This is described in reports-c.text. One of the reports that is generated contains the ranked sets of results.

As mentioned earlier AutoClass is only one possible system that can be used for the data classifier 21. Any classification technique that determines a set of classes for a given data set can be used.

In the AutoClass system, class membership is expressed probabilistically rather than as logical assignment. This is done by defining the classes in terms of parameterised probability distributions. Each example is considered to have a probability that it belongs to each of the classes. In this way, examples can be members of more than one class. However, each example must belong to at least one class because AutoClass makes the class probabilities sum to 1.

Alternatively, clustering techniques could be used for the data classifier 21. Clustering techniques act to partition the data into classes so that each example is assigned to a class. For example, one of the basic known approaches is to form a least squares fit of the data points to a pre-specified number of groupings. This requires that the number of clusters is known in advance, which is often not the case. Adaptive clustering techniques can also be used. These do not rely on predefined parameters, for example see EP-A-0436913. Clustering techniques differ from the AutoClass and other Bayesian systems which search in a model space for the "best" class descriptions. A best classification optimally trades off predictive accuracy against the complexity of the classes and does not "over fit" the data. Also, in AutoClass the classes are "fuzzy" so that an example can be a member of more than one class with different probabilities for membership.

Another possibility is to use a neural network classifier. This could neither be unsupervised or supervised. Also, the neural network can be configured to give Bayesian probability outputs if desired using known techniques. Neural networks have a number of advantages that makes them particularly suitable for use with information about the transmission of messages in a communications network and specifically for telecommunications applications. These advantages include:

neural networks can be used to discover complex underlying patterns and anomalies in communications network data;

neural networks can learn both the normal and fraudulent communications behaviour from examples;

neural networks can adapt to changes in the communications network data;

neural networks can perform data analysis on many different variables;

neural networks are excellent at performing pattern recognition tasks, such as detecting known behaviour types;

neural networks are more resilient than standard statistical techniques to noisy training data;

neural network technology only requires to be retrained periodically;

a trained neural network is able to process new communications data quickly.

Figure 6:
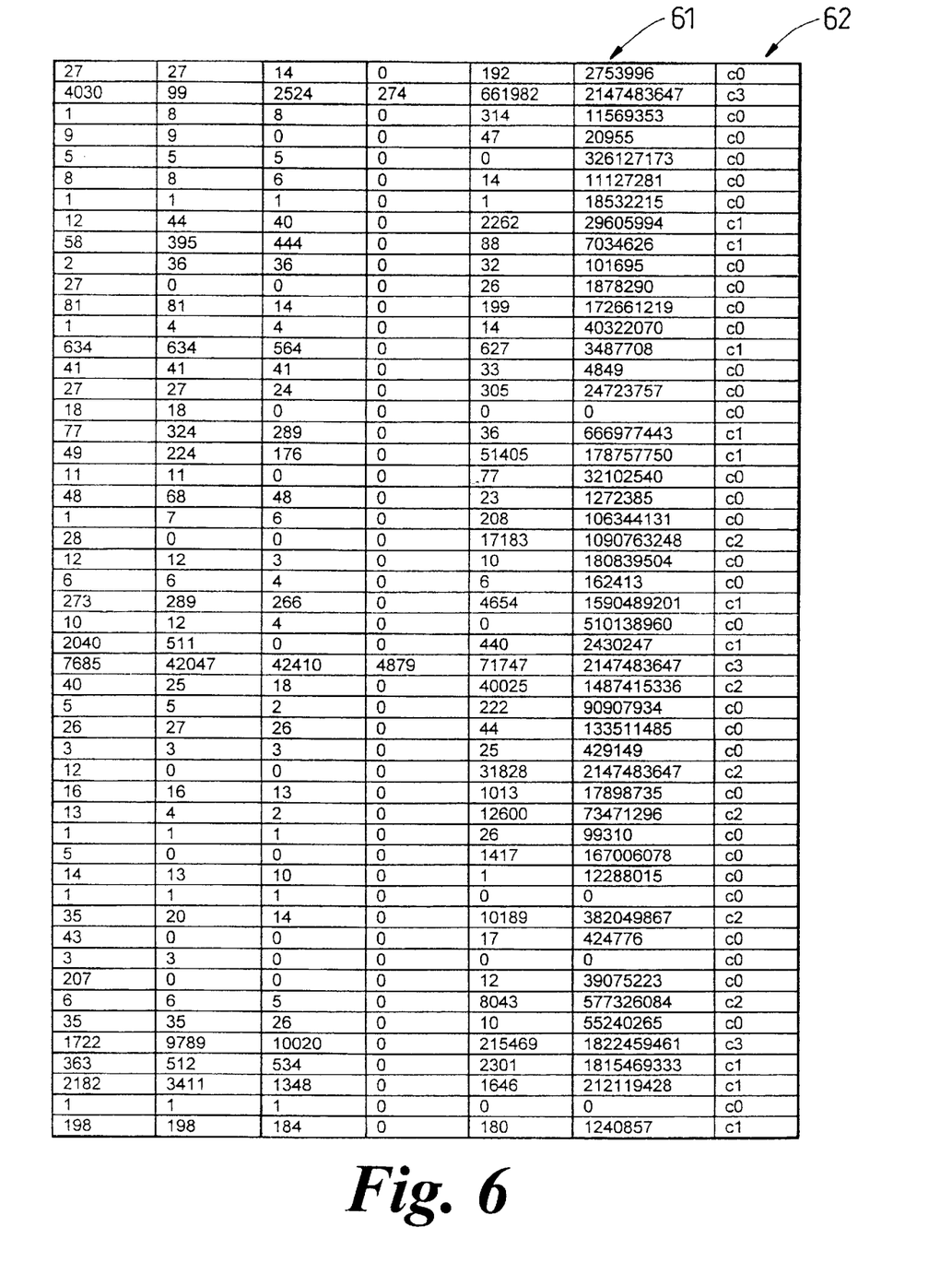
FIG. 6 shows an example of input data for the rule inducer.

Once a classification has been obtained, information about this classification 27 is combined with information about the data source 22 to provide input for the rule inducer 25. For example, in the EDNA example being discussed FIG. 6 shows the combined data ready for input to the rule inducer 25. FIG. 6 shows a table of values 61 where each row in the table is for an EDNA user. The first 6 columns of the table 61, show the attribute values as input to the data classifier 21. The last column 61 shows the class that each EDNA user has been classified into using the data classifier 21.

Alternatively the output of the data classifier 21 may already be in a form similar to that shown in FIG. 6. That is, information from the data source 22 may not need to be combined with the classification results 27.

In the example being discussed, about EDNA, the system used for the rule inducer 25 is CN2. This is a publicly available algorithm which is described in the following documents which are intended to be incorporated herein by reference:

P. Clark and T. Niblett "The CN2 Induction Algorithm", in Machine Learning Journal, 3(4), pp 261–283, Netherlands: Cluner (1989)

P. Clark and R. Boswell. "Rule Induction with CN2: Some Recent Improvements," In Machine Learning—Proceedings of the Fifth European Conference (EWSL -91), pp 151–163, Ed: Y Kodratoff, Berlin: Springer Verlag (1991).

R. Boswell "Manual for CN2 version 6.1" (1990) The Turing Institute Limited IT/P2154/RAB/4/1–5

It is not essential to use the CN2 algorithm for the rule inducer 25; alternative rule induction techniques can be used. A rule inducer is a means by which a rule-based system can learn by example. The process of rule induction involves the creation of rules from a set of examples. The idea is to create rules which describe general concepts of the example set. The term rule inducer is used here to refer to any system which involves the creation of rules from a set of examples.

CN2 is a rule induction algorithm which takes a set of examples (that are vectors of attribute values and information about which class each example is a member of) and generates a set of rules for classifying them. For example, a rule might take the form: "if telephone call number 10 has attribute A and attribute B but not attribute C then it is a member of Class 2."

Figure 7:
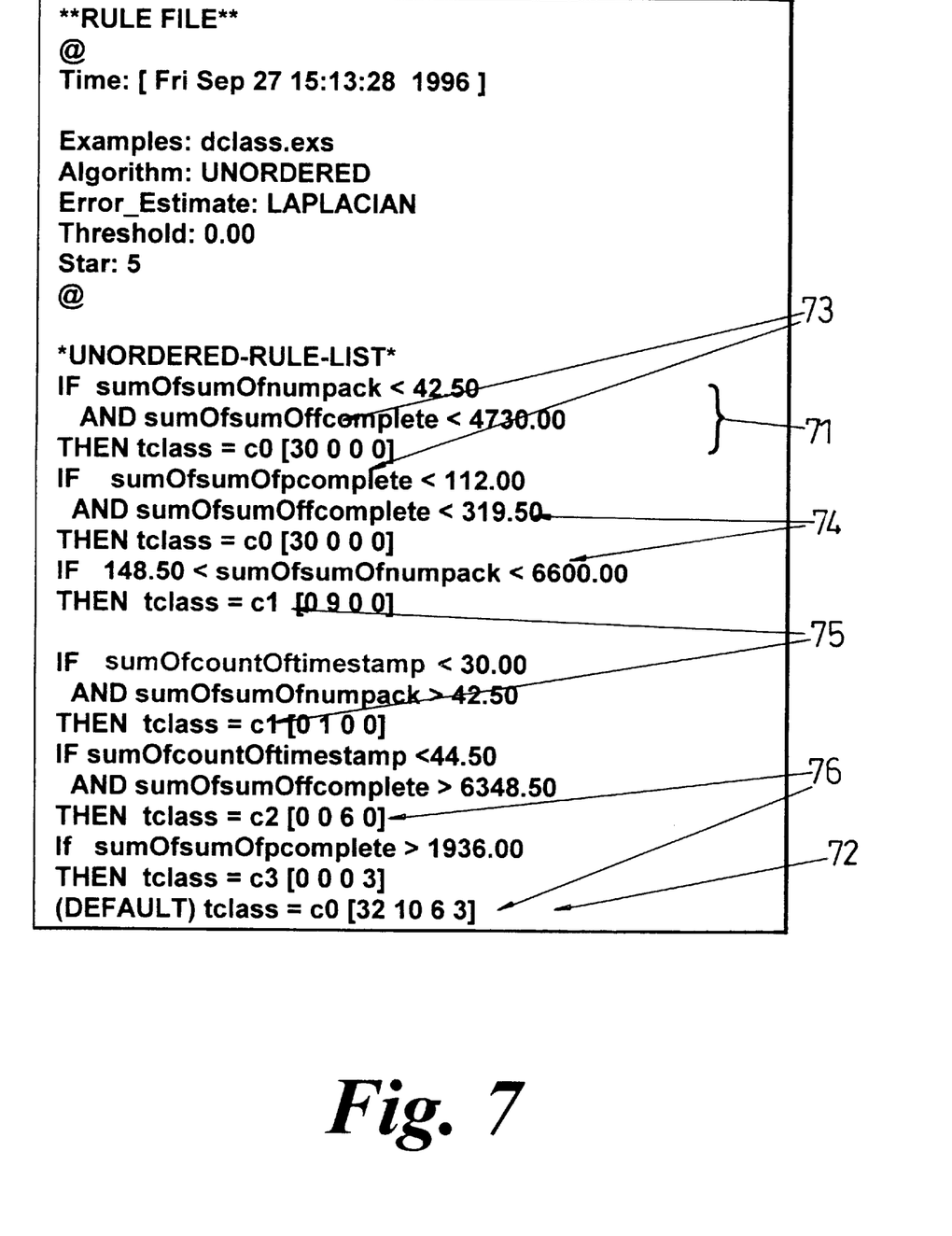
FIG. 7 shows an example of output from the rule inducer.

In the example being discussed about EDNA, the rules take the form shown in FIG. 7. This shows 6 IF-THEN rules 71 and a default condition 72. The attribute names 73 correspond to the attributes shown in FIG. 5 and the rules specify various threshold valves for the attributes 74. Each rule has a THEN portion specifying a membership of a particular Class 75. The numbers in square brackets 76 indicate how many examples met the conditions of the rule and were assigned to the particular class.

The rule inducer 25 may either be of a kind which produces an ordered sequence of rules or of a kind which produces an unordered sequence of rules. When an ordered rule sequence is produced, then when the induced rules are used to process new examples each rule is tried in order until one is found whose conditions are satisfied. Order independent rules require some additional mechanism to be provided to resolve any rule conflicts which may occur. This has the disadvantage that strict logical interpretation of the rules is detracted from. However, ordered rules also sacrifice a degree of comprehensibility as the interpretation of a single rule is dependent on which other rules preceded it in the list. The CN2 algorithm can be configured to produce either unordered or ordered rules. In the particular example being discussed about EDNA, and unordered rule list was created.

The rules obtained from the rule inducer 25 are then evaluated. This is done by comparing the information that was provided as input to the rule inducer with the rules. For example in the EDNA situation input to the rule inducer 25 took the form as shown in FIG. 6. For the first row in FIG. 6 the attribute value for sumofsumofnum pack is 27 and for sumofsumoffcomplete is 14 which satisfies the condition for the first rule in FIG. 7. This example is assigned to Class C0 following the induced rules, and from FIG. 6 we can see that it was also assigned to Class C0 by the data classifier. This type of evaluation can be carried out automatically using the CN2 system as described in the CN2 Manual referred to above.

When a successfully evaluated set of rules is obtained this can be used to create a rule based classifier. For example, FIG. 8 shows a program written in the programming language PERL. This program incorporates the rules from FIG. 7 that were produced by the rule inducer in the EDNA example. For example 81 shows one such rule. When this program is executed new examples are classified into one of the classes C0, C1, C2 or C3. In this way the program can be used to classify new examples of EDNA use into one of these predetermined 4 classes. It is not essential that the programming language PERL is used; any suitable means for executing the rules can be used.

The rule based classifier shown in FIG. 8 is static and does not "learn by example". That is, once the rules are induced and formed into the classifier they are not altered automatically. However, it is possible to incorporate the set of successfully evaluated rules into a more sophisticated rule based classifier. For example, this could be arranged to learn from new examples that are presented to the classifier for classification. Also the rules or computer system 1 can be incorporated in a case based reasoning system. In this type of system learning by analogy plays an important role. Existing knowledge is applied to a new problem instance on the basis of similarities between them. This can involve modifications of the existing knowledge to fit the new case. A case based reasoning system typically has a case base which comprises a set of relevant examples. These cases are applied to new problems by an analogical reasoning process.

Figure 4:
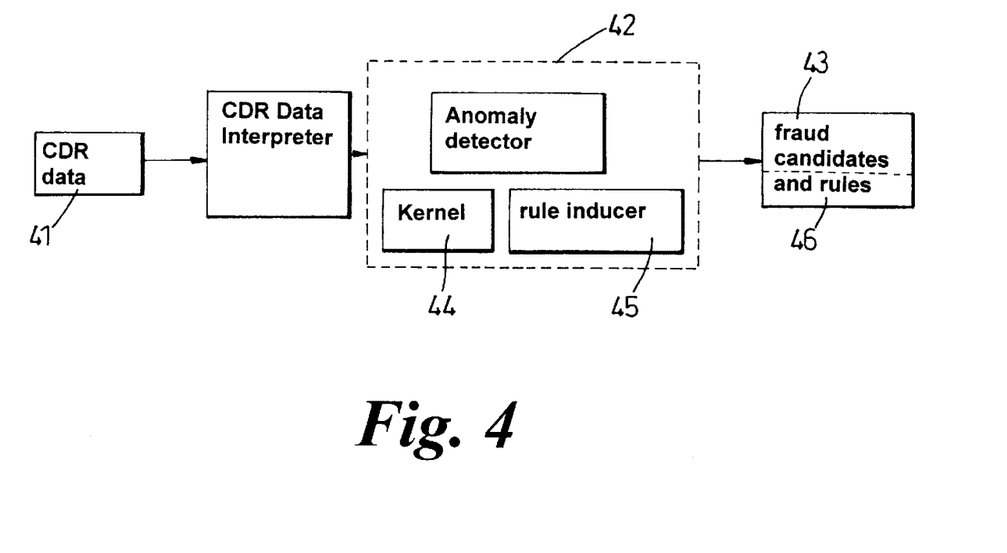
FIG. 4 shows the use of the invention for detecting and analysing telecommunications fraud.

A second example of the use of the invention is in detecting telecommunications fraud. As shown in FIG. 4 call detail record data 41 is input to an anomaly detector 42 which produces information about which of the call detail records are fraud candidates 43. The anomaly detector 42 comprises several components including a kernel 44 which incorporates a neural network. This neural network is trained to classify the input information 41 into classes indicating fraud or non-fraud candidates 43. The neural network is thus equivalent to the data classifier 21. A rule inducer 25, 45 is incorporated into the anomaly detector 42. The rule inducer 45 receives output information from the neural network which comprises a set of attributes for each customer account together with a class assignment for that customer account. The rule inducer then generates rules 24, 46.

The neural network can be of many possible types. For, example, a self-organising map or a multi-layer perceptron. For example, if a self organising map is used and the task is to detect telecommunications fraud many different classes may be produced by the neural network classifier. Some of these classes may related to known types of fraud and others to legitimate use. Still further classes may relate to unknown examples which could be new types of fraud or new types of legitimate use. When a new type of fraud evolves it is important for the operator to react to this quickly. A new "unknown" class may emerge in the self organising map which could contain new types of fraud. By using the output of the rule inducer, or extractor, the operator can quickly obtain information about the characteristics of the new class.

A wide range of applications are within the scope of the invention. For example, interpreting information relating to telecommunications fraud; credit card fraud; faults in a communications network and encryption key management. The invention applies to any situation in which a large amount of data needs to be analysed to extract features necessary for a particular task or problem domain and where it is required to explain or interpret the way in which the features were obtained. This can be used for knowledge engineering in the development of expert systems. The invention also applies to pattern recognition tasks for example taxonomy in biology, object recognition and object tracking.

What is claimed is:

1. A method of using a computer to analyze data representative of subscriber account usage comprising steps of:
   (i) providing a data classifier arranged to receive a series of inputs comprising the data representative of subscriber account usage, and to produce responsive thereto classification outputs indicative of which one of a number of classes each of said series of inputs is a member of;
   (ii) providing a rule inducer arranged to receive at least some of the series of inputs and to receive from the data classifier only the classification outputs;
   (iii) inputting the series of inputs to the data classifier so as to obtain a series of corresponding outputs each comprising an indication of which one of the number of classes the input is a member of;
   (vi) operating the rule inducer to produce, responsive to the at least some of the series of inputs and the classification outputs, a series of rules descriptive of relationships between the series of inputs and the classification outputs.

2. A method as claimed in claim 1 wherein the data classifier is unsupervised.

3. A method as claimed in claim 1 wherein the data classifier comprises a neural network.

4. A method as claimed in claim 1 wherein the data classifier comprises a Bayesian classifier.

5. A method as claimed in claim 1 wherein said step (ii) comprises combining each input with its corresponding output so as to create a second series of inputs; and inputting the second series of inputs to the rule inducer.

6. A method as claimed in claim 1 which further comprises the step of transforming the series of rules into a format such that the formatted rules can be used as a data classifier.

7. A method as claimed in claim 1 which further comprises the step of:

incorporating the rules in to a case-based reasoning system such that in use the case-based reasoning system can be used as a data classifier.

8. A computer system for analyzing data representative of subscriber account usage comprising:

a data classifier arranged to receive a series of inputs comprising the data representative of subscriber account usage, and to produce responsive thereto classification outputs each comprising an indication of which one of a number of classes each of said inputs is a member of;

a rule inducer arranged to receive at least some of said series of inputs to said data classifier and to receive from said data classifier only said series of outputs, and to produce, responsive to said at least some of said series of inputs and said series of outputs, a series of rules descriptive of relationships between said series of inputs and said classification outputs.

9. A method as claimed in claim 1 wherein the data classified is arranged to classify input data into one of a number of classes according to whether an input is indicative of a fraud or not.

10. A method as claimed in claim 9 wherein said fraud relates to fraudulent use of a telecommunications system.

11. A method of processing data representative of subscriber account usage relating to a plurality of examples using a data classifier arranged to classify input data into one of a number of classes, and a rule inducer, comprising the steps of:

(i) inputting a series of inputs to the data classifier so as to obtain a series of corresponding outputs each comprising an indication of which of the number of classes the input is a member of;

(ii) inputting said series of outputs and at least some of said series of inputs to the rule inducer so as to obtain a series of rules which describe relationships between the series of inputs to the data classifier and the series of corresponding outputs from the data classifier;

wherein said series of rules is obtained independent of information internal to the data classifier.

12. A method of processing data representative of subscriber account usage relating to a plurality of examples using a data classifier arranged to classify input data into one of a number of classes, and a rule inducer, comprising the steps of:

(i) inputting a series of inputs to the data classifier so as to obtain a series of corresponding outputs each comprising an indication of which of the number of classes the input is a member of;

(ii) inputting said series of outputs and at least some of said series of inputs to the rule inducer so as to obtain a series of rules which describe relationships between the series of inputs to the data classifier and the series of corresponding outputs from the data classifier;

wherein said series of rules is obtained independent of internal structure of said data classifier.

13. A method of identifying characteristics of a class of fraudulent use of a telecommunications network customer account, the method comprising;

using a data classifier arranged to classify input customer account records representative of subscriber account usage into one of a number of classes indicative of fraud and non-fraud candidate data;

inducing rules from customer account records input to the data classifier and from the classification information output from the data classifier, said output information comprising a set of attributes for each customer account and a class assignment for that customer account; and generating rules from the rule inducer so as to obtain a series of rules which describe relationships between the customer account records input to the data classifier and the corresponding outputs from the data classifier and wherein the rules characterise those classes to which candidate fraud data has been assigned.

14. A method according to claim 13 wherein said data classifier comprises a neural net.

15. Apparatus for identifying and characterising anomalous behaviour relating to potential fraudulent use of a network, the apparatus comprising;

a data classifier arranged to classify input call detail records representative of subscriber account usage into one of a number of classes indicative of fraud and non-fraud candidate data;

and a rule inducer for inducing rules from call detail record data input to the data classifier and from information output from the data classifier, said output information comprising a set of attributes for each customer account and a class assignment for that customer account; said rule inducer being arranged to generate rules induced therein so as to obtain a series of rules which characterise relationships between the call detail record data input to the data classifier and the series of corresponding outputs from the data classifier whereby to provide a characterisation of those classes to which the candidate fraud data has been assigned.

16. Apparatus according to claim 5 wherein said data classifier comprises a neural net.

17. A method according to claim 1 in which the subscriber account is a telecommunication subscriber account.

18. A method according to claim 1 in which the subscriber account is a credit card subscriber account.

* * * * *